(12) United States Patent
Bianco et al.

(10) Patent No.: US 11,128,229 B2
(45) Date of Patent: Sep. 21, 2021

(54) METHOD OF OPERATING A FLYBACK CONVERTER WITH ACTIVE CLAMP, CORRESPONDING CONTROL CIRCUIT AND FLYBACK CONVERTER

(71) Applicant: STMICROELECTRONICS S.R.L., Agrate Brianza (IT)

(72) Inventors: Alberto Bianco, Gressan (IT); Francesco Ciappa, Borgofranco d'Ivrea (IT); Giuseppe Scappatura, Aosta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 16/848,736

(22) Filed: Apr. 14, 2020

(65) Prior Publication Data

US 2020/0336073 A1    Oct. 22, 2020

(30) Foreign Application Priority Data

Apr. 17, 2019   (IT) .......................... 102019000006000

(51) Int. Cl.
*H02M 3/335*   (2006.01)

(52) U.S. Cl.
CPC ............................... *H02M 3/33592* (2013.01)

(58) Field of Classification Search
None
See application file for complete search history.

(56) References Cited

U.S. PATENT DOCUMENTS

| 5,245,520 | A |   | 9/1993 | Imbertson |   |
|---|---|---|---|---|---|
| 5,781,420 | A | * | 7/1998 | Xia | H02M 3/33576 363/21.06 |
| 5,886,881 | A | * | 3/1999 | Xia | H02M 3/33592 363/21.06 |
| 6,278,621 | B1 | * | 8/2001 | Xia | H02M 3/33592 363/21.06 |
| 7,760,525 | B2 |   | 7/2010 | Sutardja |   |
| 7,872,879 | B2 |   | 1/2011 | Degen et al. |   |
| 10,003,267 | B1 |   | 6/2018 | Zhao et al. |   |
| 10,205,377 | B1 |   | 2/2019 | Bianco et al. |   |

(Continued)

OTHER PUBLICATIONS

Bianco et al., "A Novel Noncomplementary Active Clamp Flyback Control Technique," IEEE Applied Power Electronics Conference and Exposition (APEC), Mar. 17-21, 2019, Anaheim, California, 4 pages.

*Primary Examiner* — Jeffrey A Gblende
*Assistant Examiner* — Henry E Lee, III
(74) *Attorney, Agent, or Firm* — Seed IP Law Group LLP

(57) ABSTRACT

The present disclosure relates to solutions for operating a flyback converter comprising an active clamp. The flyback converter comprises two input terminals and two output terminals. A first electronic switch and the primary winding of a transformer are connected in series between the input terminals. An active clamp circuit is connected in parallel with the primary winding. The active clamp circuit comprises a series connection of a clamp capacitor and a second electronic switch. A third electronic switch and the secondary winding of the transformer are connected in series between the two output terminals. In particular, the present disclosure relates to solutions for switching the first, second and third electronic switch in order to achieve a zero-voltage switching of the first electronic switch.

19 Claims, 9 Drawing Sheets

(56) References Cited

U.S. PATENT DOCUMENTS

| | | | |
|---|---|---|---|
| 10,389,223 B1 | 8/2019 | Bianco et al. | |
| 10,651,746 B2* | 5/2020 | Song | H02M 3/33538 |
| 10,651,748 B2* | 5/2020 | Jitaru | H02M 3/335 |
| 10,651,749 B2* | 5/2020 | Song | H02M 3/33507 |
| 10,972,014 B2* | 4/2021 | Jitaru | H02M 3/33507 |
| 2011/0305048 A1 | 12/2011 | Yang et al. | |
| 2012/0218785 A1 | 8/2012 | Li et al. | |
| 2015/0016153 A1 | 1/2015 | Orr et al. | |
| 2018/0342957 A1 | 11/2018 | Bianco et al. | |
| 2019/0097540 A1 | 3/2019 | Gherdovich et al. | |
| 2019/0109543 A1 | 4/2019 | Adragna et al. | |
| 2020/0091826 A1* | 3/2020 | Yang | H02M 3/33523 |

* cited by examiner

METHOD OF OPERATING A FLYBACK CONVERTER WITH ACTIVE CLAMP, CORRESPONDING CONTROL CIRCUIT AND FLYBACK CONVERTER

BACKGROUND

Technical Field

The embodiments of the present description refer to solutions for operating of a flyback converter with active clamp.

Description of the Related Art

Electronic converters, such as for example AC/DC or DC/DC switched mode power supplies, are well known in the art. There exist many types of electronic converters that may be divided mainly into isolated and non-isolated converters. For example, non-isolated electronic converters are converters of the buck, boost, buck-boost, Cuk, SEPIC, and ZETA types. Instead, isolated converters comprise a transformer, such as flyback and forward converters. These types of converters are well known to the person skilled in the art.

For example, FIG. 1 shows an example, of a flyback converter 20 with active clamp. In the example considered, the electronic converter 20 comprises a first and a second input terminal 200a and 200b for receiving a DC input voltage $V_{in}$ and a first and a second output terminal 202a and 202b for providing a DC output voltage $V_{out}$. For example, the input voltage $V_{in}$ may be supplied by a DC voltage source 10, such as a battery. Generally, the DC input voltage $V_{in}$ may also be generated from an AC voltage via a rectifier circuit. Conversely, the output voltage $V_{out}$ may be used to supply an electric load 30.

A flyback converter comprises a transformer T comprising a primary winding T1 and a secondary winding T2. Specifically, a first terminal of the primary winding T1 is connected (e.g., directly) to the (positive) input terminal 200a and a second terminal of the primary winding T1 is connected (e.g., directly) via (the current path of) an electronic switch S1 to the (negative) input terminal 200b, which often represents a ground. Accordingly, the electronic switch S1 is configured to selectively connect the primary winding selectively to the input terminals 200a and 200b, i.e., the voltage $V_{in}$. For example, in the example considered, the electronic switch S1 is implemented with a n-channel Field Effect Transistor (FET), such as a n-channel Metal-Oxide-Semiconductor Field-Effect Transistor (MOSFET), i.e., a NMOS. In this case, the drain terminal of the transistor S1 is connected to the second terminal of the primary winding T1, representing the phase node of the flyback converter, and the source terminal of the transistor S1 is connected to the terminal 200b.

Moreover, in the example considered, an electronic switch S3 and the secondary winding T2 are connected (e.g., directly) in series between the output terminals 202a and 202b. For example, a first terminal of the secondary winding T2 may be connected (e.g., directly) to the (positive) output terminal 202a and a second terminal of the secondary winding T2 may be connected (e.g., directly) via (the current path of) the electronic switch S3 to the (negative) output terminal 202b. Accordingly, the electronic switch S3 is configured to selectively connect the secondary winding T2 to the output terminals 202a and 202b. For example, in the example considered, the electronic switch S3 is implemented with a n-channel FET, such as a NMOS. In this case, the drain terminal of the transistor S3 may be connected to the second terminal of the secondary winding T2 and the source terminal of the transistor S3 may be connected to the terminal 202b. Those of skill in the art will appreciate that the switch S3 is often implemented with a diode.

Moreover, a capacitor C is often connected (e.g., directly) between the terminals 202a and 202b.

As well-known, a conventional flyback converter 20 is operated with two switching states. When the switch S1 is closed and the switch S3 is opened, the primary winding T1 of the transformer T1 is directly connected to the input voltage $V_{in}$. Accordingly, the primary current Ipri and the magnetic flux in the transformer T increases, thereby storing energy in the transformer T. In this condition, the capacitor C supplies energy to the output terminals 202a and 202b, i.e., the load 30. Conversely, when the switch S1 is opened and the switch S3 is closed, the primary current Ipri drops to zero, while current starts flowing in the secondary winding, and the energy from the transformer core T recharges the capacitor C and supplies the load 30.

However, such a hard switching of the switch S1 has the disadvantage that the switch S1 is not closed a zero voltage. For this reason, flyback converters comprising an active clamp circuit have been proposed.

Specifically, in FIG. 1, the flyback converter 20 comprises moreover a series connection of a clamp capacitor C2 and an electronic switch S2, which is connected in parallel with the primary winding T1 of the transformer T, i.e., the electronic switch S2 is configured to selectively connect the capacitor C2 in parallel with the primary winding T1. Specifically, in the example considered, a first terminal of the primary winding T1 is connected (e.g., directly) to a first terminal of the capacitor C2 and a second terminal of the primary winding T1 (i.e., the phase node/intermediate point between the primary winding T1 and the electronic switch S1) is connected (e.g., directly) via (the current path of) the electronic switch S2 to the second terminal of the capacitor C2. For example, in the example considered, the electronic switch S2 is implemented with a n-channel FET, such as a NMOS. In this case, the drain terminal of the transistor S2 may be connected to the second terminal of the capacitor C2 and the source terminal of the transistor S2 may be connected to the phase node/second terminal of the primary winding T1.

Generally, the electronic switches S1, S2 and S3 are driven via respective drive signals LSGD, HSGD and SRGD, which are generated by a suitable control circuit 210, e.g., as a function of the output voltage $V_{out}$ at the terminals 202a and 202b. For example, such an active clamp circuit (comprising the capacitor C2 and the switch S2) and the respective operation of the flyback converter is described in document US 2011/0305048 A1. Substantially, the active clamp circuit permits to recover the energy in the leakage inductance of the transformer T and permits to implement a soft switching of the electronic switch S1.

As mentioned before, in an ideal flyback converter, when the control circuit 210 turns off the electronic switch S1, the current Ipri in the primary winding T1 stops immediately, while the current starts to flow in the secondary side T2, because the control circuit 210 closes the electronic switch S3. In a real transformer T, anyway, the two windings T1 and T2 are not perfectly coupled, and a leakage inductance remains in the primary side. Substantially, such a leakage inductance $L_S$ may be modelled via an inductance connected in series with the primary winding T1. Conversely, the magnetizing inductance $L_M$ of the transformer T (used to model the magnetic flux) may be modelled with an inductance connected in parallel with the primary winding T1.

Thus, when the control circuit 210 turns off the electronic switch S1, the primary current Ipri continues to flow in the primary side T1 due to the leakage inductance $L_S$, thereby creating a spike on the primary winding T1. Specifically, the electronic switch S1 has associated a parasitic capacitance C1 connected in parallel with the electronic switch S1, such as the parasitic drain-source capacitance of a respective FET. Thus, the current provided by the leakage inductance $L_S$ of the transformer T will charge this capacitance C1. Typically, such a spike is followed by a ringing, which attenuates due to losses in the system, until all the energy, which was stored in the leakage inductance $L_S$ (when the electronic switch S1 has been turn off), is dissipated.

Substantially, the addition of the electronic switch S2 and the capacitor C2 permits to deviate the energy in the leakage inductance $L_S$ into the clamp capacitor C2. Specifically, when the control circuit 210 turns off the electronic switch S1, the phase node (between the primary winding T1 and the electronic switch S1, e.g., the drain terminal of the transistor S1) rises as in a normal flyback converter (without active clamp). Anyway, when the voltage on the phase node bypasses the voltage on the clamp capacitor C2, the body diode of the electronic switch S2 (or a similar diode D2 connected in parallel with the electronic switch S2) turns on and the primary current Ipri flows also to the capacitor C2 until the primary current Ipri drops to zero. By turning on the electronic switch S2, the energy stored on the capacitor C2 can be given back to the system.

For example, typically the control circuit 210 is configured to control the active clamp in a complementary mode, i.e., the electronic switch S2 is opened when the electronic switch S1 is closed, and the electronic switch S2 is closed (often after a brief dead-time) when the electronic switch S1 is opened.

The inventors have observed that such a complementary control has some drawbacks. For example, often the current Ipri generated on the primary side has a very high root mean square (RMS) value, because current is flowing in the primary side both when the electronic switch S1 is closed and when the electronic switch S2 is closed.

BRIEF SUMMARY

Considering the foregoing, an object of various embodiments of the present disclosure is to provide solutions for operating a flyback converter with an active clamp.

According to one or more embodiments, the above object is achieved by a method of operating a flyback converter having the distinctive elements set forth specifically in the ensuing claims. The embodiments moreover concern a corresponding control circuit and flyback converter.

The claims form an integral part of the technical teaching of the description provided herein.

As mentioned before, various embodiments of the present disclosure relate to solutions for operating a flyback converter having an active clamp.

In various embodiments, the flyback converter comprises a first and a second input terminal for receiving an input voltage and a first and a second output terminal for providing an output voltage. The flyback converter comprises moreover a transformer comprising a primary and a secondary winding, wherein a leakage inductance and a magnetizing inductance are associated with the transformer.

In various embodiments, a first electronic switch and the primary winding are connected in series between the first and the second input terminal, wherein the intermediate node between the first electronic switch and the primary winding represents a phase node, wherein a capacitance is associated with the phase node. For example, the first electronic switch may be a n-channel FET.

In various embodiments, an active clamp circuit is connected in parallel with the primary winding, wherein the active clamp circuit comprises a series connection of a clamp capacitor and a second electronic switch. For example, the second electronic switch may be a n-channel FET.

In various embodiments, a third electronic switch and the secondary winding are connected in series between the first and the second output terminal. For example, the third electronic switch may be a n-channel FET or a diode.

In various embodiments, a control circuit of the electronic converter may thus repeat the following steps for each switching cycle:

during a first time interval, closing the first electronic switch and opening both the second and the third electronic switch, whereby the primary winding is connected to the input voltage and the current flowing through the primary winding increases, thereby storing energy in the transformer;

during a subsequent second time interval, opening the first, the second and the third electronic switch, whereby the current flowing through the primary winding charges the capacitance associated with the phase node;

during a subsequent third time interval, opening the first electronic switch and closing both the second and the third electronic switch, whereby the clamp capacitor is connected in parallel with the primary winding and the current flowing through the primary winding charges also the clamp capacitor, wherein the third time interval ends when the current flowing through the primary winding reaches zero;

during a subsequent fourth time interval, closing the third electronic switch and opening both the first and the second electronic switch, whereby the current flowing through the primary winding is zero and the energy stored in the transformer is released via a current flowing through the secondary winding, wherein the fourth time interval ends when the current flowing through the secondary winding reaches zero;

during a subsequent fifth time interval, opening the first electronic switch and closing both the second and the third electronic switch, whereby the clamp capacitor is connected in parallel with the primary winding, whereby the clamp capacitor and the leakage inductance form a resonant circuit having a given resonance period, and wherein the fifth time interval ends after one or more half-periods of the resonance period;

during a subsequent sixth time interval, closing the second electronic switch and opening both the first and the third electronic switch, whereby the current flowing through the primary winding decreases, and wherein the sixth time interval ends when the current flowing through the primary winding is negative; and during a subsequent seventh time interval, opening the first, the second and the third electronic switch, whereby the negative current flowing through the primary winding discharges the capacitance associated with the phase node.

Generally, the second electronic switch may comprise a diode. In this case, the second electronic switch may be closed during the third time interval by closing this diode.

Similarly, the third electronic switch may comprise or even consist in a diode. In this case, and the third electronic switch may be closed during at least one (or even all) of the third time interval, the fourth time interval and the fifth time interval by closing this diode.

In various embodiments, the control circuit may control the duration of the sixth time interval by determining a reference value for the current flowing through the primary winding during the sixth time interval, the reference value being indicative of the energy to discharge the capacitance, and ending/stopping the sixth time interval when the current flowing through the primary winding exceeds the given reference value. Alternatively, the control circuit may determining a duration for the sixth time interval as a function of the duty cycle of the flyback converter, the duty cycle corresponding to the ratio between the duration of the first time interval and the duration of a switching cycle, and ending/stopping the sixth time interval after the determined duration for the sixth time interval.

In various embodiments, the capacitance value of the clamp capacitor should thus be selected in an appropriate manner. For example, in various embodiments, a maximum value for the output voltage and a minimum value for the input voltage is determined/obtained, e.g., based on the product specification of the electronic converter. Next, a minimum clamp time is determined as a function of the maximum value for the output voltage and the minimum value for the input voltage, and the capacitance value of the clamp capacitor is selected, such that a half-period of the resonance period of the clamp capacitor and the leakage inductance is shorter than the minimum clamp time.

BRIEF DESCRIPTION OF THE SEVERAL VIEWS OF THE DRAWINGS

The embodiments of the present disclosure will now be described with reference to the annexed plates of drawings, which are provided purely to way of non-limiting example and in which.

DETAILED DESCRIPTION

In the ensuing description, various specific details are illustrated aimed at enabling an in-depth understanding of the embodiments. The embodiments may be provided without one or more of the specific details, or with other methods, components, materials, etc. In other cases, known structures, materials, or operations are not shown or described in detail so that various aspects of the embodiments will not be obscured.

Reference to "an embodiment" or "one embodiment" in the framework of this description is meant to indicate that a particular configuration, structure, or characteristic described in relation to the embodiment is comprised in at least one embodiment. Hence, phrases such as "in an embodiment", "in one embodiment", or the like that may be present in various points of this description do not necessarily refer to one and the same embodiment. Moreover, particular conformations, structures, or characteristics may be combined in any adequate way in one or more embodiments.

The references used herein are only provided for convenience and hence do not define the sphere of protection or the scope of the embodiments.

Figure 1:
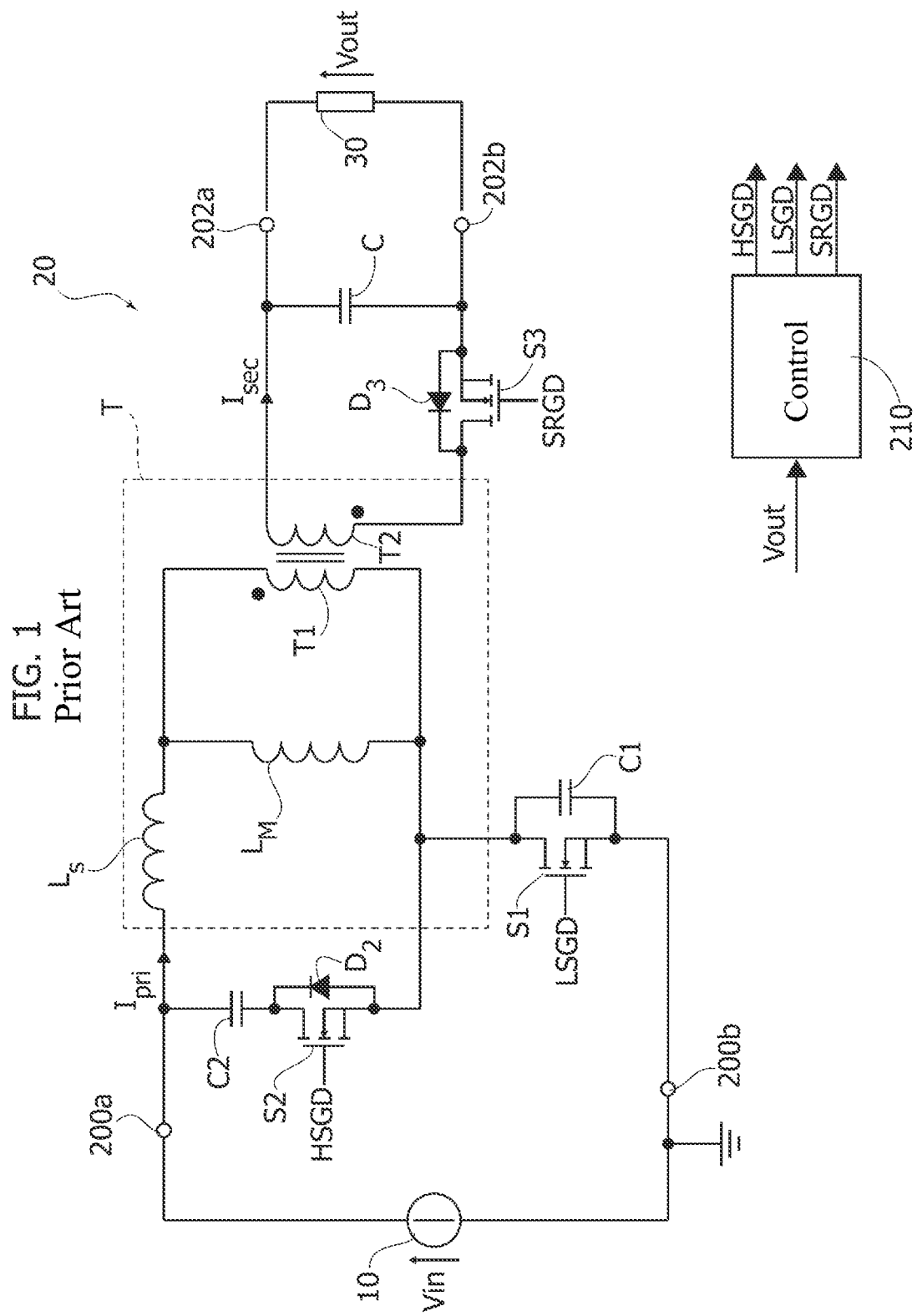
FIG. 1 shows an example of a flyback converter comprising an active clamp.

In FIGS. 2 to 8 described below, parts, elements or components that have already been described with reference to FIG. 1 are designated by the same references used previously in these figures. The description of these elements has already been made and will not be repeated in what follows in order not to burden the present detailed description.

Various embodiments of the present description relate to the operation of a flyback converter comprising an active clamp. The general architecture of such a flyback converter 20 is shown in FIG. 1, and the respective description applies in its entirety, in particular with respect to the connection of the flyback converter (transformer T, electronic switches S1 and S3, and capacitor C) and the active clamp (electronic switch S2 and capacitor C2). In this respect the present description relates to the control implemented within the control circuit 210. Specifically, such a control circuit may be any suitable analog and/or digital processing circuit, including a dedicated integrate control circuit or a programmable processing unit, such as a micro-processor programmed via software instructions.

As described in the foregoing, the control circuit 210 may drive such an active clamp with a complementary control, usually comprising four phases, which are repeated periodically:

during a first time interval $\Delta t1$, the electronic switch S1 is closed and the electronic switch S2 is opened;
during a second (dead-time) interval $\Delta t2$, the electronic switch S1 is opened and the electronic switch S2 remains open;
during a third time interval $\Delta t3$, the electronic switch S1 remains open and the electronic switch S2 is closed; and
during a fourth (dead-time) interval $\Delta t4$, the electronic switch S1 remains open and the electronic switch S2 is opened.

Figure 2A:
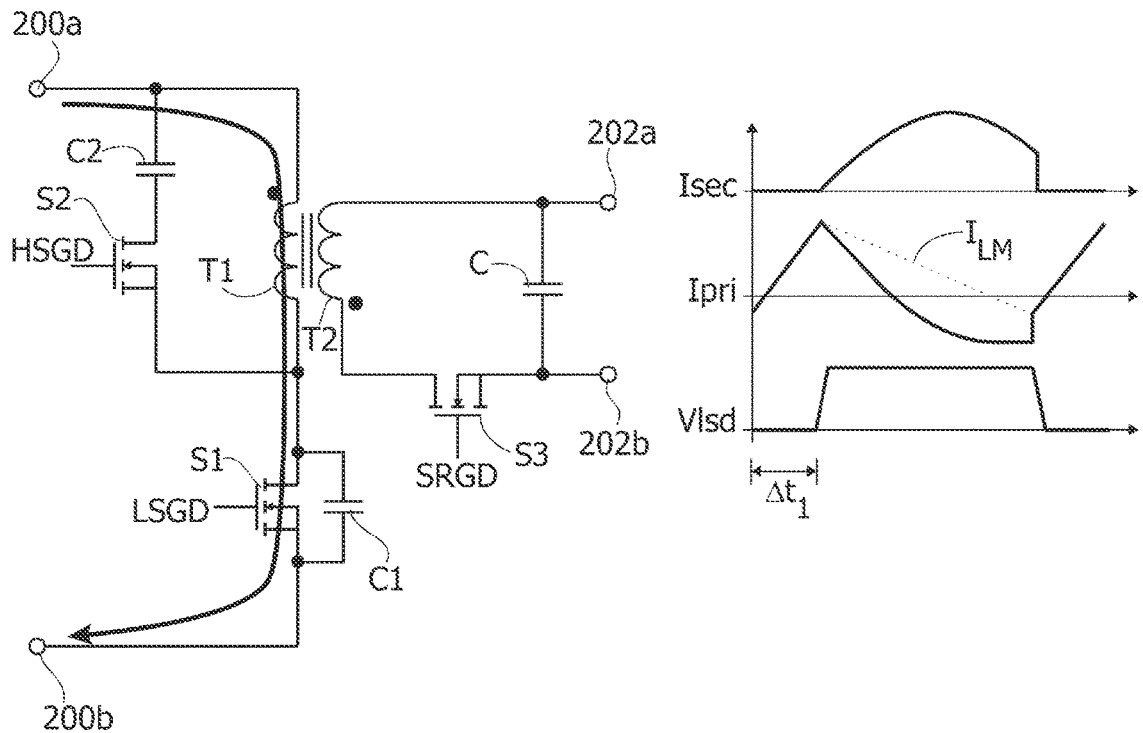
FIGS. 2A to 2D show an embodiment of the control of the flyback converter of FIG. 1.

As schematically shown in FIG. 2A, during the time interval $\Delta t1$, the current Ipri in the primary side flows through the transformer T and increases linearly at a rate:

$$dIpri/dt = V_{in}/Lpri$$

where Lpri represents the equivalent inductance at the primary side $Lpri = L_S + L_M$.

Figure 2B:
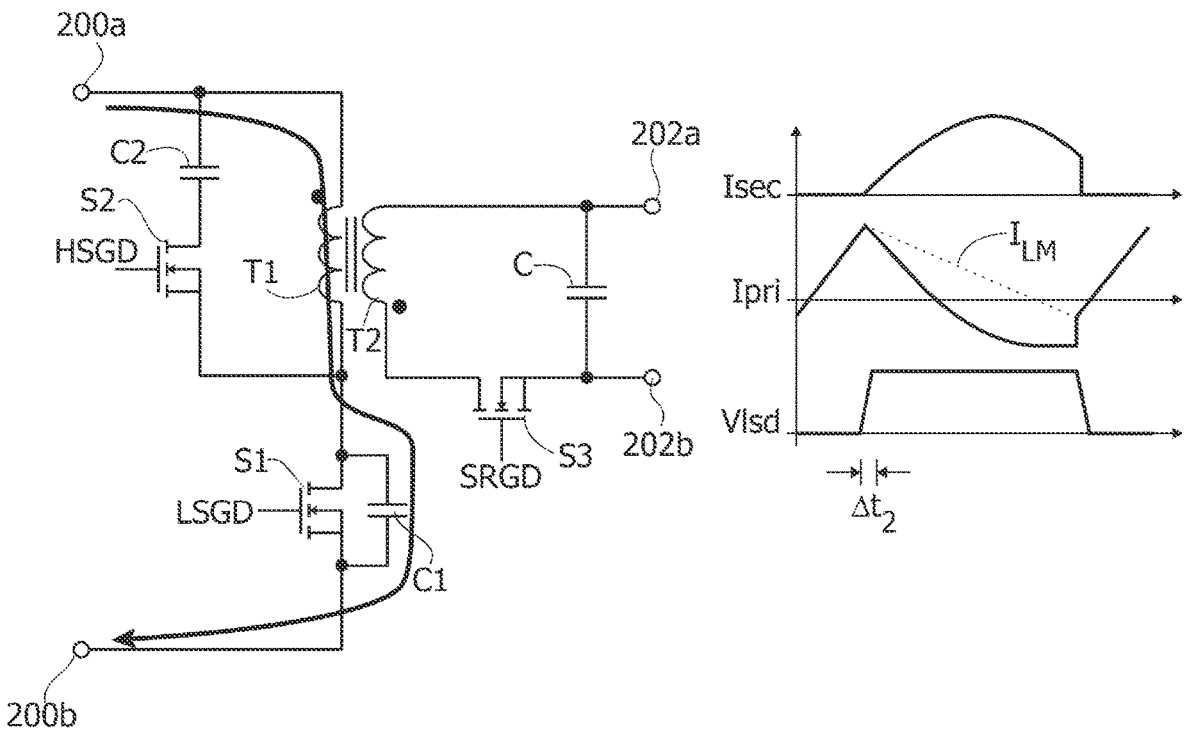

As schematically shown in FIG. 2B, during the time interval $\Delta t2$, both primary side electronic switches S1 and S2 are switched off. The current Ipri flows through the primary side of the transformer T and the parasitic capacitors C1 at the phase node (between the transformer T and the electronic switch S1), thereby increasing the voltage Vlsd at this node, which, e.g., corresponds to the drain-source voltage of a respective low-side FET S1.

Figure 2C:
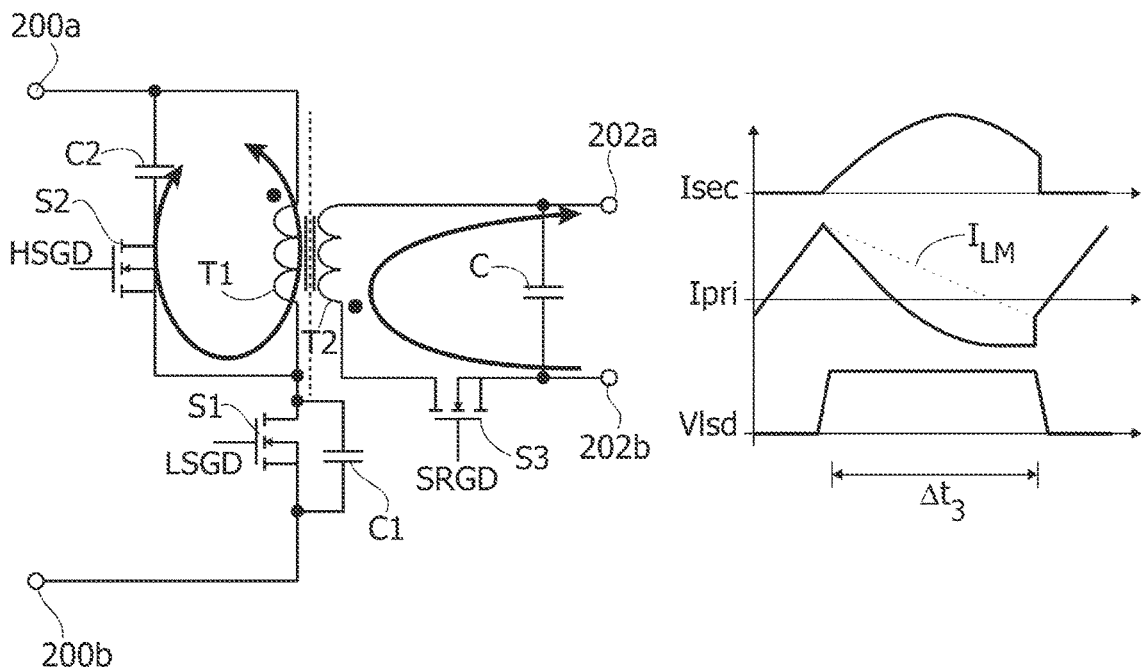

As schematically shown in FIG. 2C, during the time interval $\Delta t3$, the current Ipri flows through the primary side T1. By providing a suitable dimensioning the leakage inductance $L_S$ of the transformer T and the clamp capacitance C2, an oscillation may be generated by these components.

At the same time the difference between the magnetizing current $I_{LM}$ flowing through the magnetizing inductance $L_M$ and the leakage current $I_{LS}$ flowing through the leakage inductance $L_S$ flows (in scaled form due to the turn ratio n of the transformer T) as secondary current Isec through the secondary side T2 of the transformer T.

Figure 2D:
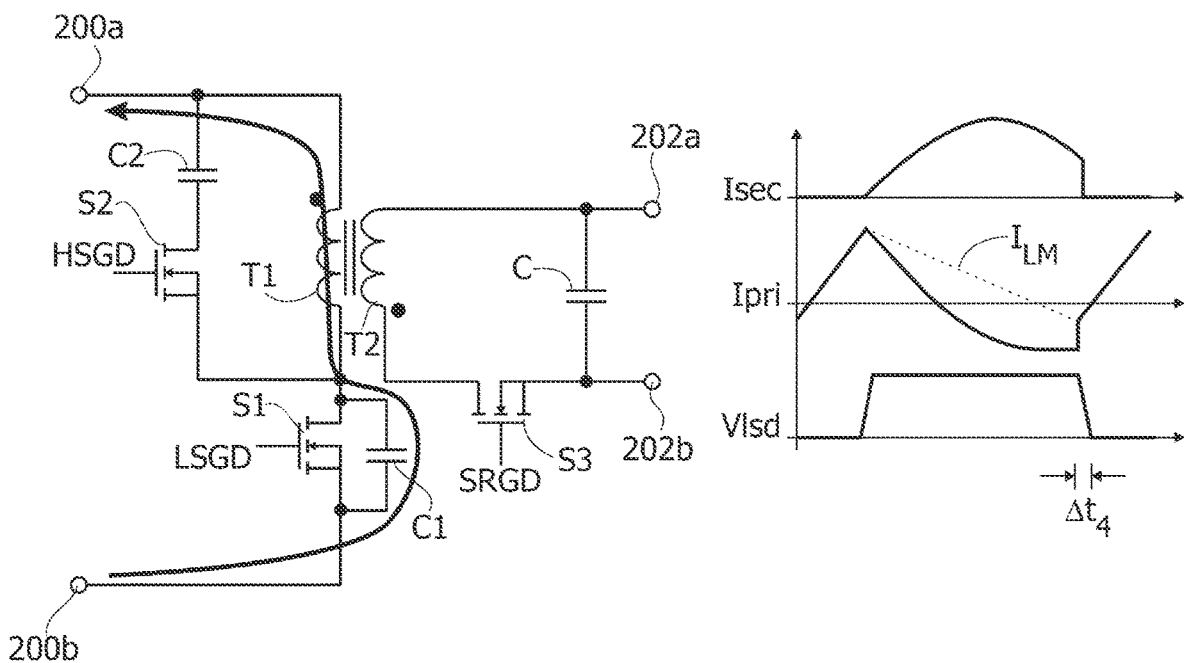

As schematically shown in FIG. 2D, during the time interval Δt4, by switching off the electronic switch S2 at the end of the interval Δt3 when the primary side current Ipri is negative, this negative current flows through the transformer T and the parasitic capacitances C1 at the phase node, thereby discharging the parasitic capacitances C1. If the energy in the magnetizing $L_M$ and/or leakage inductance $L_S$ are high enough when the electronic switch S2 is turned off at the end of the interval Δt3, the phase node drops down to zero, thereby permitting a full zero voltage switching (ZVS) of the electronic switch S1 at the beginning of the following interval Δt1.

As described in the foregoing, such a complementary control has several drawbacks. However, the inventors have observed that the active clamp may also be driven with a non-complementary control.

Figure 8:
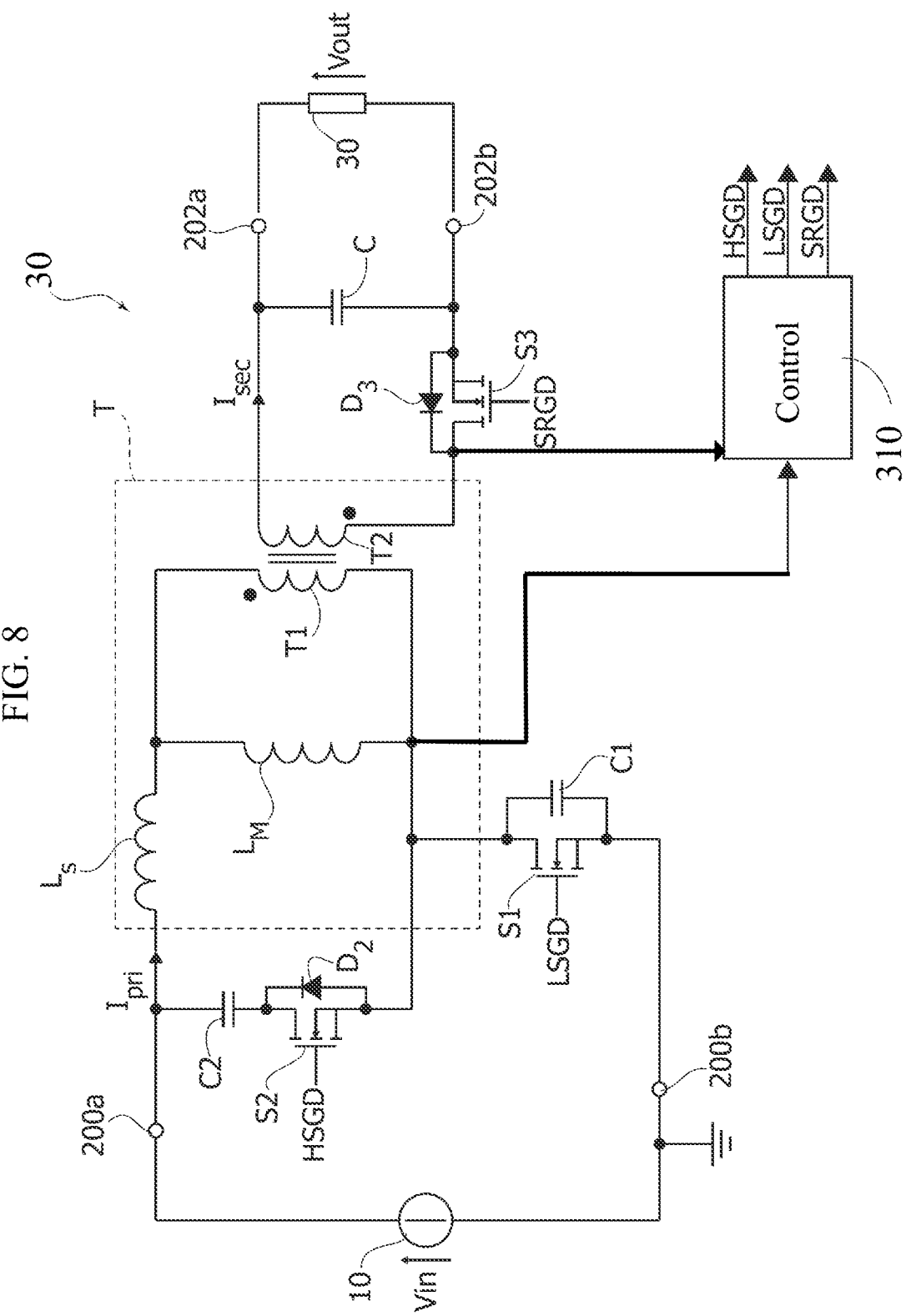
FIG. 8 shows a flyback converter comprising an active clamp according to one embodiment of the present disclosure.

FIG. 8 shows a flyback converter 30 that includes a control circuit 310 for driving the active clamp with a non-complementary control according to one embodiment of the present disclosure.

Figure 3A:
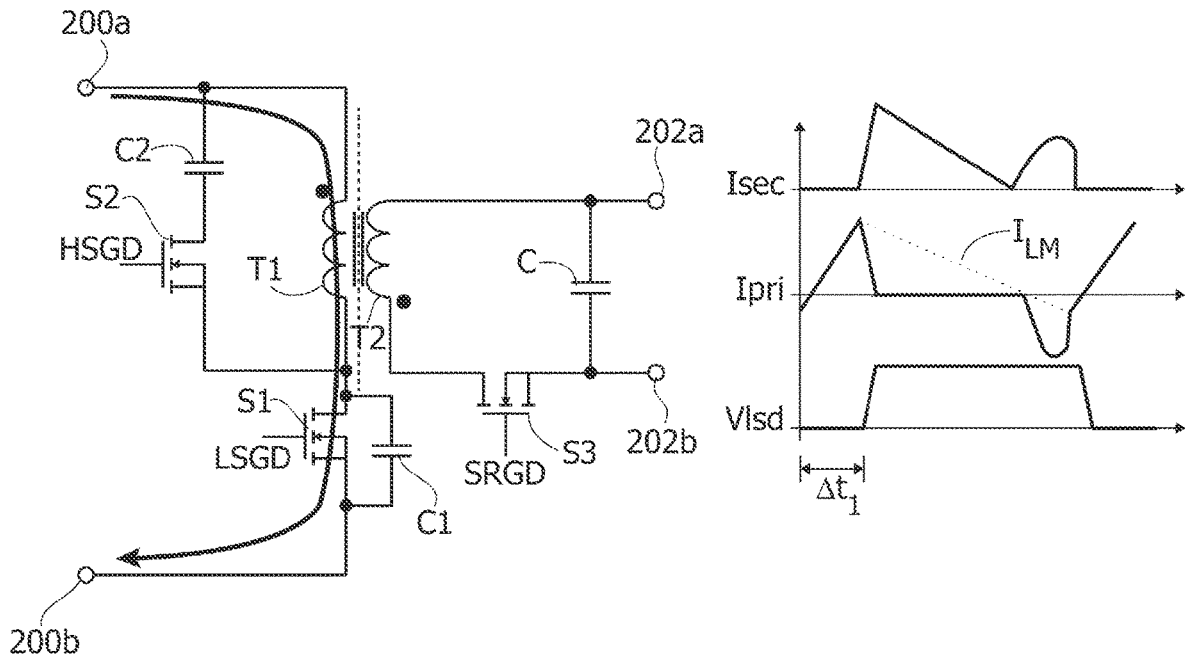
FIGS. 3A to 3E, and 4 show an embodiment of the control of the flyback converter of FIG. 8.

Specifically, as schematically shown in FIG. 3A, by closing the electronic switch S1 during the time interval Δt1 (with the switches S2 and S3 opened), the current Ipri in the primary side flows through the transformer T and increases linearly. Substantially, this phase is unchanged compared to the complementary control shown in FIG. 2A.

Figure 3B:
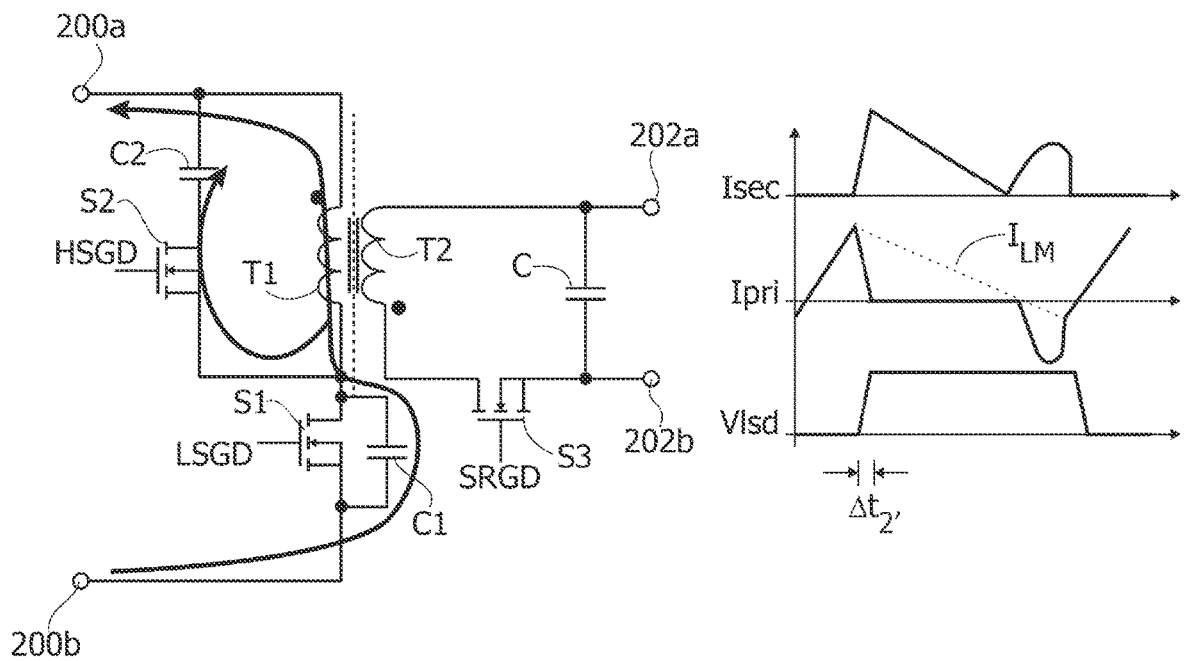

As schematically shown in FIG. 3B, during a second time interval Δt2', the control circuit 310 keeps all electronic switches S1, S2 and S3 opened. However, when implementing the electronic switch S2 with a FET, at the end of this phase, the current Ipri in the primary side leakage inductance is steered to the clamp capacitor C2 through the body diode of the transistor S2 (or a similar diode D2 connected in parallel with the electronic switch S2) until the current Ipri drops to zero.

Figure 3C:
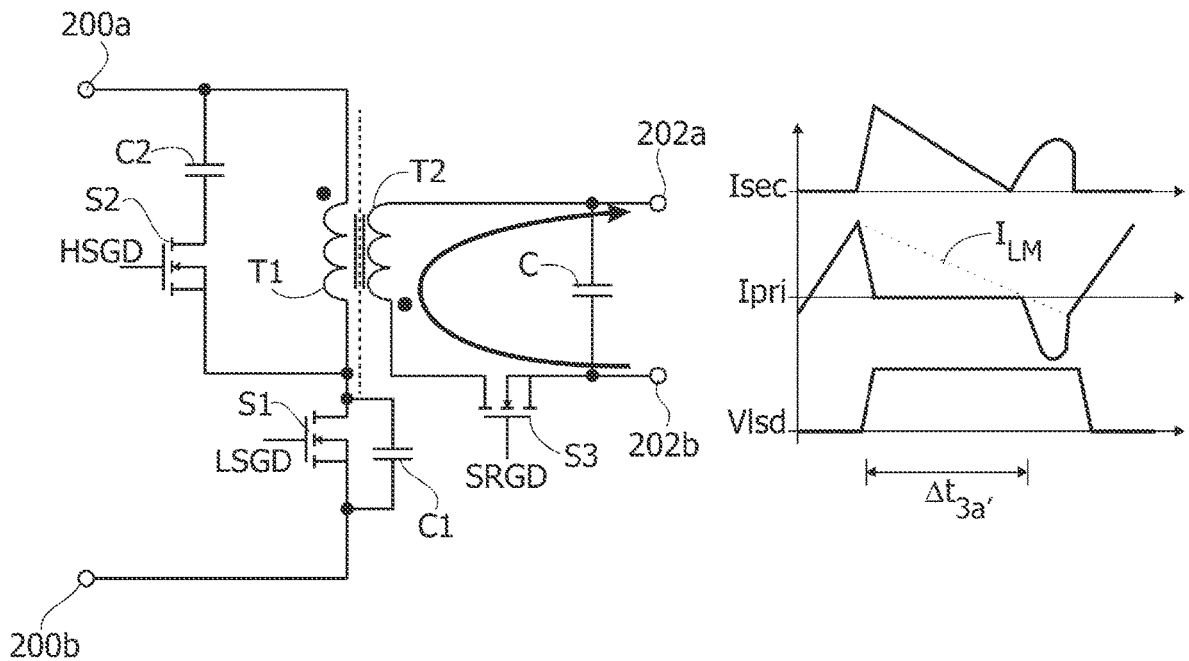

As schematically shown in FIG. 3C, during a third time interval Δt3a', the high side switch S2 is kept off (or in can be kept on for the period of conduction of the diode associated with the switch S2), while the rectifier switch S3 is turned on. Substantially, in this phase, no current can flow on the primary side (Ipri=0), while the current flows to the output on the secondary side T2. Substantially, this phase corresponds to the flyback phase of a traditional flyback converter.

Figure 3D:
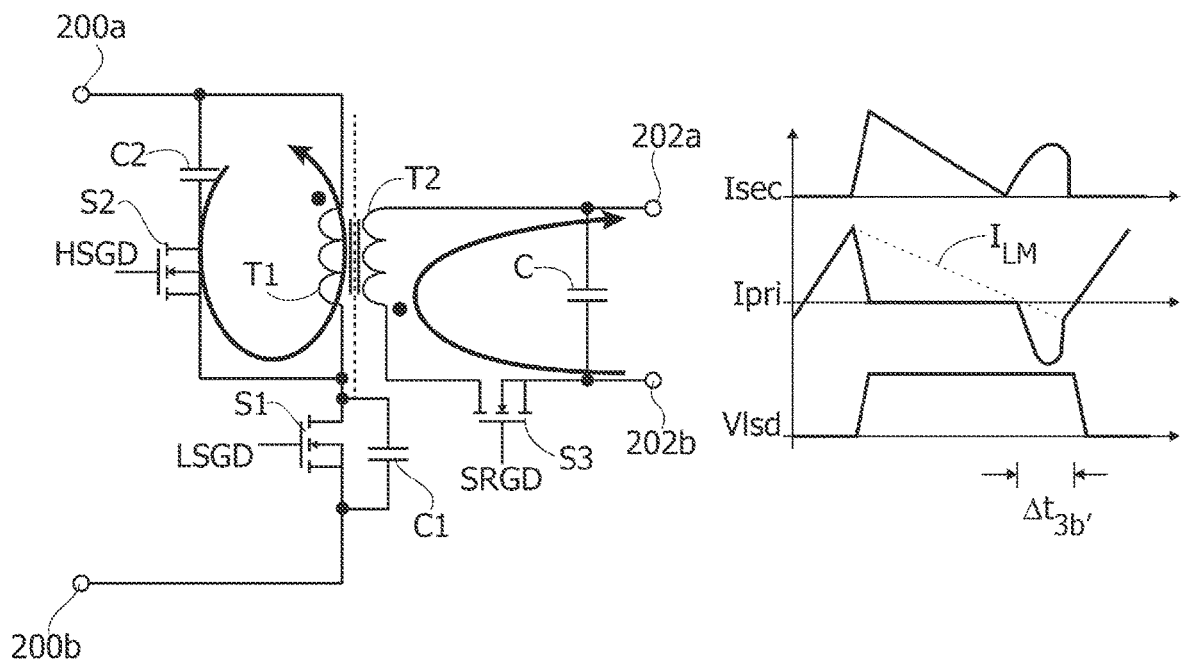

As schematically shown in FIG. 3D, when the current Isec on the secondary side T2 reaches zero, the control circuit 310 turns on the high side switch S2, thereby starting a fourth time interval Δt3b'. Substantially, at the beginning of this interval, the voltage on the clamp capacitor C2 is slightly higher than the voltage reflected from the secondary side, whereby the current Isec on the secondary side starts again to increase. Substantially, in this condition may again be present a resonance between the clamp capacitance C2 and the leakage inductance $L_S$. At the same time, the current $I_{LM}$ on the magnetizing inductance $L_M$ becomes negative.

After a time which is preferably long enough to provide enough energy in the magnetizing inductance $L_M$ to force a soft switching, both the rectifier (S3) and the high side (S2) electronic switch are turned off, thereby terminating the fourth time interval Δt3b'.

Figure 3E:
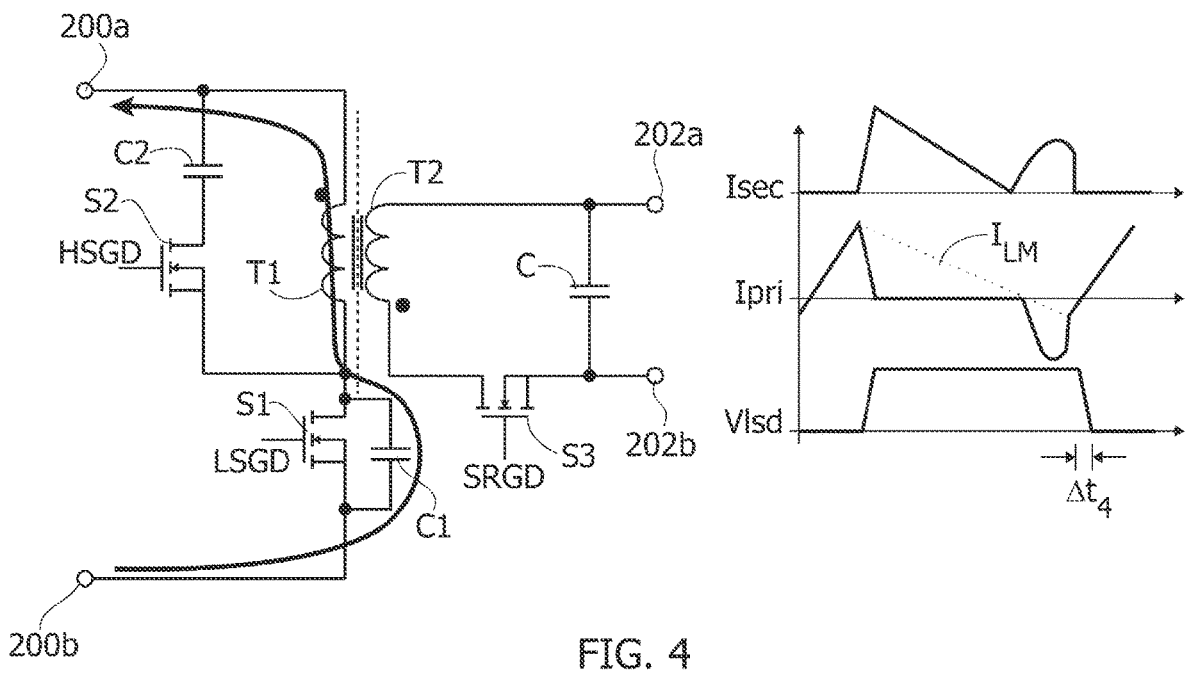

Thus, as schematically shown in FIG. 3E, by switching off the electronic switch S2 at the end of the interval Δt3b', when the magnetizing current Iii is negative, this negative current flows through the transformer T and the parasitic capacitances C1 at the phase node, thereby discharging the parasitic capacitances C1 and permitting a full zero voltage switching of the electronic switch S1 at the beginning of the following interval Δt1.

Figure 4:
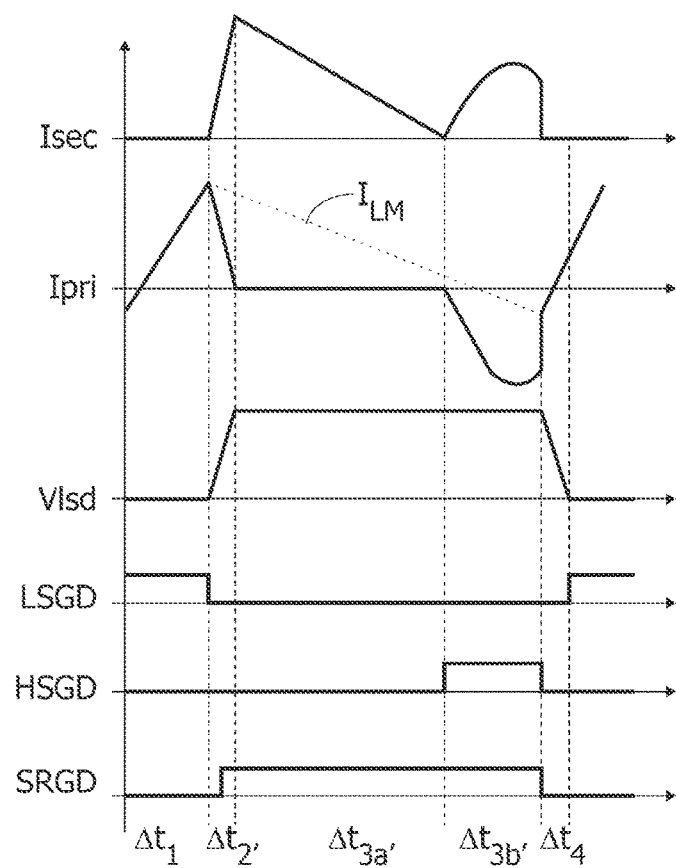

FIG. 4 shows in this respect an embodiment of the waveforms of the secondary side current Isec, the primary side current Ipri (including also the part of the magnetizing current $I_{LM}$), the voltage Vlsd at the phase node (between the primary winding T1 and the electronic switch S1) and the drive signals LSGD, HSGD and SRGD for the switches S1, S2 and S3, respectively.

The inventors have observed that such a non-complementary control permits to reach low ringing on the secondary side T2 by tuning the transformer ratio n (ratio between the windings of the primary winding T1 and the secondary winding T2) and the clamp capacitance C2 for a given input voltage $V_{in}$ and output voltage $V_{out}$. However, the inventors have observed that it is difficult to provide a matching for a wide range of input/output voltages.

Figure 6:
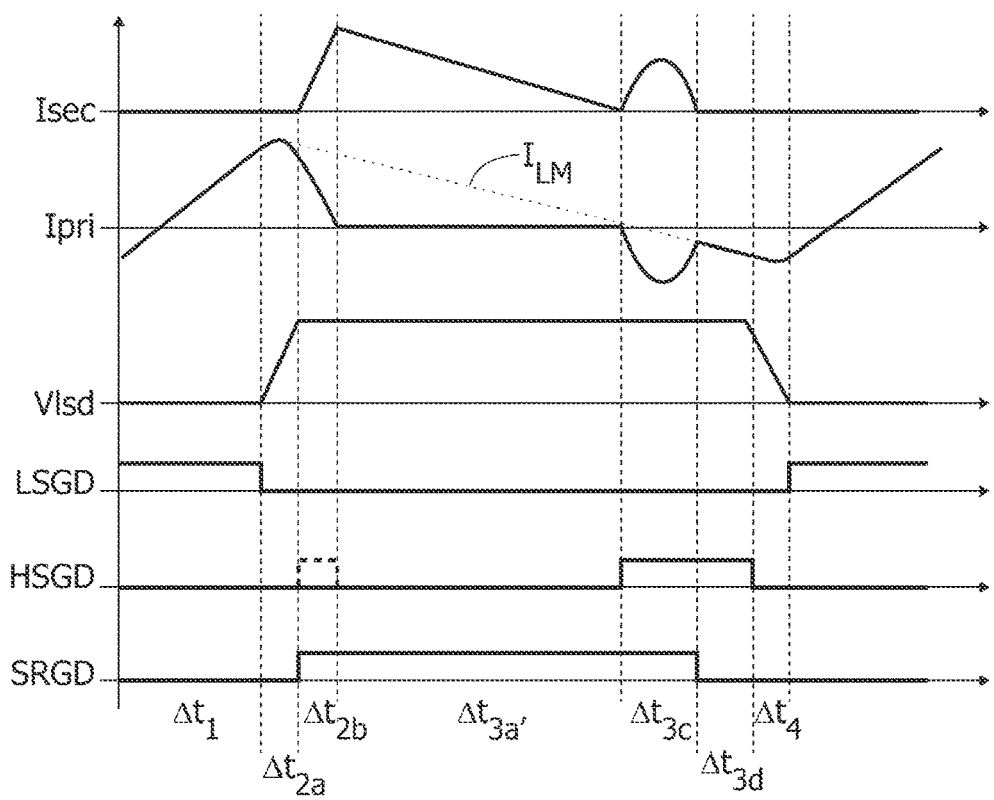

FIG. 6 shows an embodiment of a modified control implemented within the control circuit 310.

Specifically, during a first time interval Δt1, the control circuit generates the drive signal LSGD, HSGD and SRGD in order to close the electronic switch S1, and open the electronic switches S2 and S3. Substantially, this phase remains unchanged compared to the controls shown in FIGS. 2A and 3A. Thus, the primary winding T1 is connected to the input voltage $V_{in}$ and the current Ipri in the primary side T1 increases linearly. As will be described in greater detail in the following, in various embodiments, the control circuit 310 may vary the duration of the time interval Δt1 in order to regulate the output voltage $V_{out}$ to a given reference value indicative of a requested output voltage.

During a second time interval Δt2a, the control circuit 310 keeps all electronic switches S1, S2 and S3 opened. Thus, the (positive) current Ipri in the primary side leakage inductance at the end of the interval Δt1 charges the parasitic capacitance C1 and the voltage Vlsd at the phase node increases.

Once the voltage Vlsd at the phase node reaches a given threshold, the electronic switch S2 is closed. Specifically, for this purpose the control circuit 310 may set the control signal HDGD in order to directly close the electronic switch S2, or the electronic switch S2 may be closed automatically via respective diode D2 connected in parallel with the electronic switch S2, such as the body diode of a respective FET. For example, the use of such a diode D2 has the advantage that the control circuit 310 does not have to monitor the voltage at the phase node.

Thus, during the following third time interval Δt2b the current Ipri in the primary side leakage inductance is also provided to the clamp capacitor C2 until it drops to zero. For example, for this purpose, the control circuit 310 may monitor the current Ipri and determine when the current Ipri reaches zero. As may be seen in FIG. 8, the control circuit 310 may have a first input coupled to the transformer T in order to detect the current Ipri, such as via a sense resistor (not shown).

In the embodiment considered, the control circuit 310 closes the electronic switch S3 during the time interval Δt2b, thereby permitting a current flow at the secondary side T2 of the transformer T. As will be described in greater detail in the following, the electronic switch S3 may also be implemented only with a diode D3 or a diode D3 may be connected in parallel with the electronic switch S3, such as the body diode of a respective FET. Accordingly, also the drive signal SRGD may not be required and thus is purely optional.

Thus, the time intervals Δt2a and Δt2b substantially correspond to the second time interval Δt2' described with respect to FIG. 3B.

Accordingly, in the embodiment considered, at the end of the interval Δt2b the primary side current Ipri reaches zero and the secondary side current Isec reaches its maximum peak value.

During the following time interval Δt3a' the electronic switches S1 and S2 are thus opened and the electronic switch S3 is closed. Accordingly, the primary side current Ipri remains zero, while the current Isec flows to the output on the secondary side T2. Specifically, the time interval Δt3a' ends when the secondary side current Isec reaches zero. For example, for this purpose, the control circuit 310 may monitor the current Isec and determine when the current Isec reaches zero. As may be seen in FIG. 8, the control circuit 310 may have a second input coupled to the drain of the electronic switch S3 in order to detect the current Isec, such as via a sense resistor (not shown).

Substantially, this time interval Δt3a' corresponds to the flyback phase already described with respect to FIG. 3C. However, compared to the embodiment described with respect to FIGS. 3 and 4, the operation changes for the following time intervals.

Specifically, similar to FIG. 3D, the control circuit 310 closes then the electronic switch S2 during a time interval Δt3c.

Figure 5A:
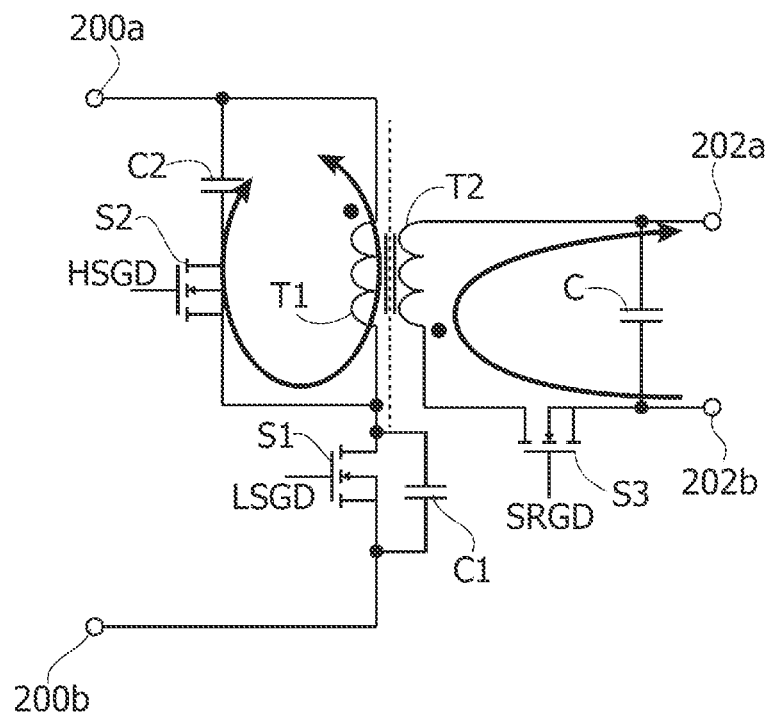
FIGS. 5A, 5B and 6 show an embodiment of the control of the flyback converter of FIG. 8.

Specifically, as shown in FIG. 5A, during this switching state, the electronic switch S1 is opened and the electronic switches S2 and S3 are closed. Thus, this switching state corresponds more or less to the switching state described with respect to FIG. 3D, with some substantive difference which will be described in greater detail in the following.

Specifically, at the beginning of this interval Δt3c, the voltage on the clamp capacitor C2 is slightly higher than the voltage reflected from the secondary side, whereby the current Isec on the secondary side starts again to increase. Moreover, in this condition is present a resonance between the clamp capacitance C2 and the leakage inductance $L_S$ of the transformer. Specifically, this resonance has a period Tres corresponding to:

$$Tres = 2\pi \sqrt{L_S \cdot C2} \quad (1)$$

At the same time, the current Iii on the magnetizing inductance $L_M$ becomes negative.

However, with respect to FIG. 3D, in the embodiment considered, the time interval Δt3c ends after Tres/2, i.e., after a semi-period of the oscillation of the clamp capacitance C2 and the leakage inductance $L_S$. In various embodiments, the control circuit 310 may determine the end of the time interval Δt3c by determining whether the current Isec reaches again zero or the duration of the time interval Δt3c may be fixed to Tres/2.

Thus, while in FIG. 3D, the current at both primary and secondary side is truncated, in the presently considered embodiment, the time interval Δt3c ends at the instant when the secondary side current Isec reaches zero.

Thus, at the beginning of the following time interval Δt3d, the control circuit 310 may open the electronic switch S3 at zero current.

Figure 5B:
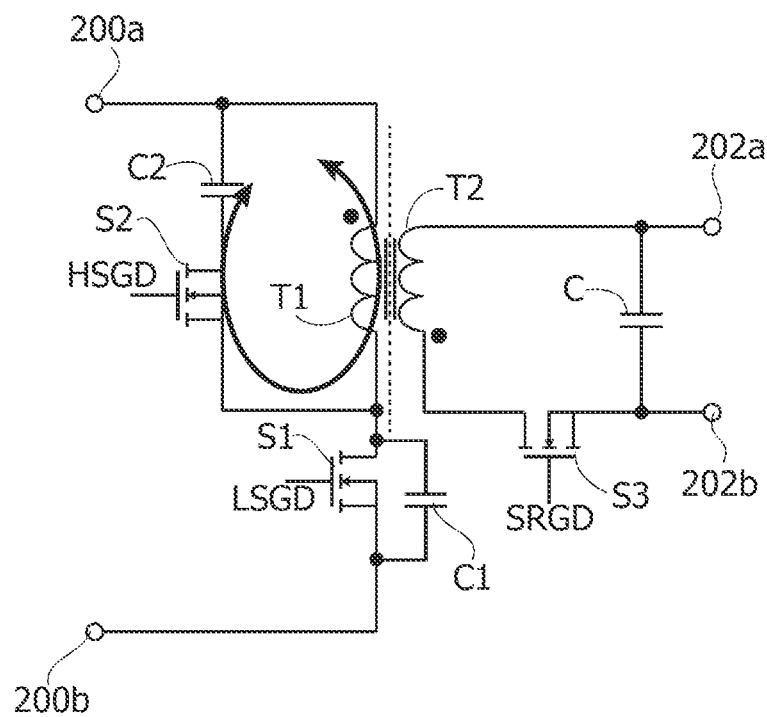

The respective switching state during the interval Δt3d is shown in FIG. 5B. Specifically, during the interval Δt3d, the electronic switches S1 and S3 are opened, and the electronic switch S2 remains closed.

In various embodiments, the duration of this phase Δt3d is determined by the energy to be stored on the transformer magnetizing inductance $L_M$ to obtain soft switching of the electronic switch S1 in the next phase.

The inventors have observed that the energy $E_{SS}$ to obtain such a soft switching can be approximated as $$E_{SS} = \tfrac{1}{2} C1 V_{in}^2 \quad (2)$$

Starting from zero crossing (at the end of the interval Δt3a'/beginning of the interval Δt3c), the current in the magnetizing inductor $L_M$ increases approximately as $$I_{LM} = \frac{nV_{out}}{L_M} t_{clamp} \quad (3)$$

where n is the turn ration between the primary and the secondary winding and tclamp is the total clamp time corresponding to the sum of the durations of the intervals Δt3c and Δt3d (i.e., tclamp=Δt3c+Δt3d).

The energy $E_{LM}$ in the magnetizing inductor $L_M$ is:

$$E_{LM} = \tfrac{1}{2} L_M I_{LM}^2 \quad (4)$$

i.e., by combining equations (3) and (4):

$$E_{LM} = \frac{1}{2} \frac{n^2 V_{out}^2}{L_M} t_{clamp}^2 \quad (5)$$

Accordingly, to obtain an energy $E_{LM}$ in the magnetizing inductor equal to energy $E_{SS}$, the total clamp time may be calculated from equations (2) and (5) as:

$$t_{clamp} = \frac{1}{n} \sqrt{C1 L_M} \frac{V_{in}}{V_{out}} \quad (6)$$

Thus, equation (6) can be used to calculate the total clamp duration $t_{clamp}$. Alternatively, equations (2) and (4) may be used to determine a threshold value for the current at the primary side Ipri (which during the interval Δt3d corresponds to the magnetization current $I_{LM}$) and the control circuit 310 may monitor the primary side current Ipri and the control circuit 310 may end the interval Δt3d when the primary side current Ipri reaches the given threshold value.

Thus, at the end of the interval Δt3d, the primary current Ipri is negative and the magnetizing inductance $L_M$ has stored enough energy to discharge the parasitic capacitance C1 associated with the phase node.

During a following time interval Δt4, the control circuit 310 may thus switch off the electronic switch S2. Thus, during the time interval Δt4 (which substantially corresponds to the situation already described with respect to FIGS. 2D and 3E, the negative primary current Ipri flows through the transformer T and the parasitic capacitances C1 at the phase node, thereby discharging the parasitic capacitances C1. Moreover, once the voltage Vlsd at the phase node reaches zero, the control circuit 310 may close again the electronic switch S1, thereby starting the following time interval Δt1. For example, for this purpose the control circuit

310 may monitor the voltage at the phase node. Generally, the duration of the time interval Δt4 may also be fixed.

Thus, in the embodiment considered, each switching cycle has the following switching duration $T_{SW}$:

$$T_{SW} = \Delta t1 + \Delta t2a + \Delta t2b + \Delta t3a' + \Delta t3c + \Delta t3d + \Delta t4.$$

In the embodiment considered, the electronic switch S3 is closed when the secondary current Isec is positive (intervals Δt2b, Δt3a' and Δt3c). Thus, this electronic switch S3 could also be implemented with a diode D3 or with a diode connected in parallel with the electronic switch S3, such as a body diode of a respective FET, wherein either:

the anode of the diode D3 is connected to the terminal 202b and the cathode is connected to the secondary winding T2 (as shown in FIG. 1), or the anode of the diode is connected to the secondary winding T2 and the cathode is connected to the terminal 202a.

Moreover, as described in the foregoing, the start and end of the interval Δt2b may be automatically by connecting a diode D2 in parallel with the electronic switch S2, such as the body diode of a respective FET, wherein the anode is connected to the phase node and the cathode is connected to the capacitor C2.

Thus, in various embodiments, the control circuit 310 may generate the control signals LSGD and HSGB in order to control the duration Δt1 (electronic switch S1 is closed) and the duration $t_{clamp} = \Delta t3c + \Delta t3d$ (electronic switch S2 is closed). Generally, in the embodiments considered, the control circuit 310 should also determine the end of the interval Δt3a' when the secondary side current Isec reaches zero.

Specifically, the control circuit 310 may vary the duration Δt1 in order to obtain a given output voltage $V_{out}$. In fact, in a flyback converter the ratio $V_{in}/V_{out}$ between the input and the output voltage is proportional to the term D/(1-D), where $D = \Delta t1/T_{SW}$ is the duty cycle.

Conversely, as described with respect to equation (6) the duration $t_{clamp}$ should also take into account the ratio $V_{in}/V_{out}$. Thus, instead of measuring the input voltage $V_{in}$, the duration $t_{clamp}$ may be calculated by multiplying a fixed parameter with D/(1-D), i.e., the control circuit 310 may determine the duration $t_{clamp}$ as a function of the duty cycle D, which in turn is determined as a function of the duration Δt1.

In the embodiment considered, the clamp capacitor C2 should thus be dimensioned in order to store enough energy for reaching the ZVS condition on the primary side T1, but small enough to complete a half resonance with the leakage inductance $L_S$ during phase Δt3c.

Specifically, as shown in equation (1), the minimum clamp duration is determined by the clamp capacitor C2 and leakage inductance $L_S$ values. Generally, the inventors have observed, that it is desirable to maintain this duration as short as enables to obtain soft switching in the condition having the shortest clamping time, which, as shown in equation (6), happens in the operating condition when the input voltage $V_{in}$ has its minimum value and the output voltage $V_{out}$ has its maximum value.

The inventors have observed that this control gives best results with a synchronous rectifier on the second side, while it can be applied even to system with non-synchronous rectification.

Figure 7:
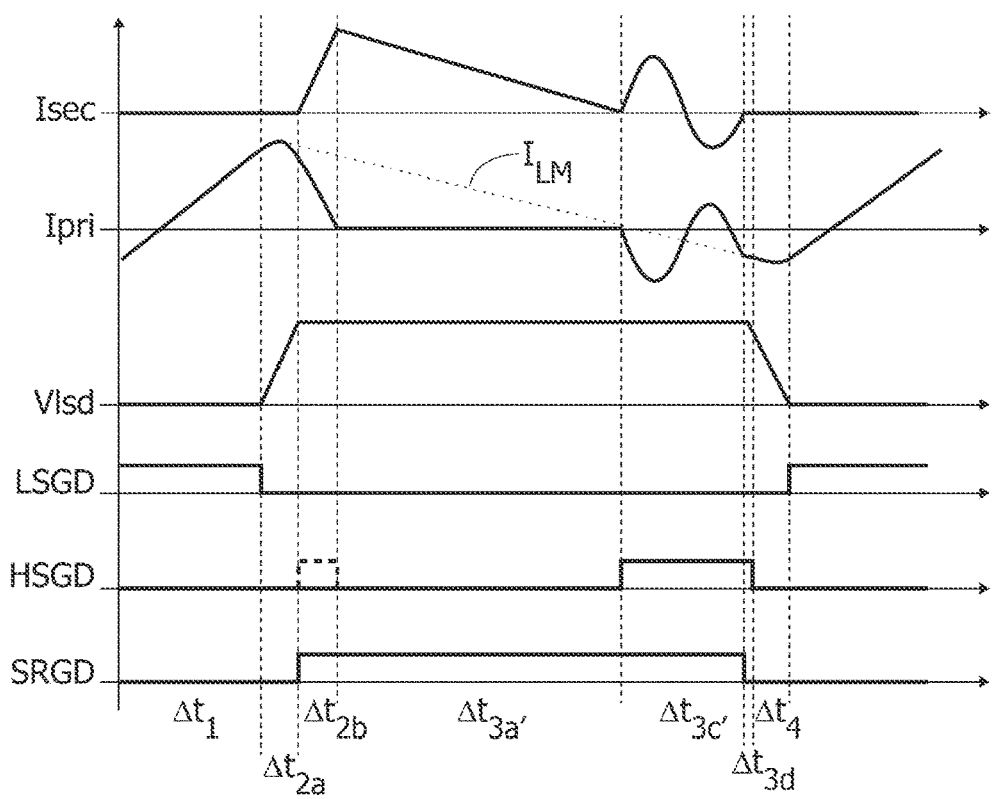
FIG. 7 shows an embodiment of the control of the flyback converter of FIG. 8.

FIG. 7 shows a second embodiment of the driving implemented within the control circuit. Specifically, as described in the foregoing, the control circuit 310 determines the end of the interval Δt3c when the secondary side current Isec reaches zero, e.g., by either monitoring the secondary side current Isec or by using a fixed duration for the interval Δt3c, which corresponds to Tres/2.

However, as shown in FIG. 7, the control circuit 310 does not necessarily have to terminate the interval Δt3c (interval Δt3c' in FIG. 7) after the first half-period of the resonance Tres, but the control circuit 310 may terminate the interval Δt3c' after a multiple of Tres/2, i.e., at instants which correspond to multiple half-periods of the oscillation. In fact, in each of these instants the secondary side current Isec would be zero. Thus, in various embodiments, the control circuit 310 may determine the end of the time interval Δt3c' by determining whether the current Isec has reached zero for a given number N of times or the duration of the time interval Δt3c may be fixed to N·Tres/2, with N being a positive integer number. For example, in FIG. 2, the duration of the interval Δt3c' corresponds to Tres, i.e., N=2.

Of course, without prejudice to the principle of the disclosure, the details of construction and the embodiments may vary widely with respect to what has been described and illustrated herein purely by way of example, without thereby departing from the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a flyback converter, comprising:
   during a first time interval of a switching cycle, closing a first electronic switch and opening second and third electronic switches, the first electronic switch being connected with a primary winding of a transformer between first and second input terminals for receiving an input voltage, the first electronic switch and primary winding being coupled to each other at a phase node and a capacitance is associated with the phase node, second electronic switch and a clamp capacitor being connected to each other as an active clamp circuit connected in parallel with the primary winding, the third electronic switch and a secondary winding of the transformer being connected between first and second output terminals for providing an output voltage, wherein closing the first electronic switch during the first time interval electrically couples the primary winding to said input voltage and causes a current flowing through said primary winding to increase, thereby storing energy in said transformer;

during a subsequent second time interval of the switching cycle, opening said first switch, and keeping open said second and third electronic switches, whereby the current flowing through said primary winding charges said capacitance associated with said phase node;

during a subsequent third time interval of the switching cycle, keeping open said first electronic switch and closing both said second and third electronic switches, which electrically couples said clamp capacitor with said primary winding and the current flowing through said primary winding charges also said clamp capacitor, wherein said third time interval ends when said current flowing through said primary winding reaches zero;

during a subsequent fourth time interval of the switching cycle, keeping open said first electronic switch, keeping closed said third electronic switch, and opening said second electronic switch, whereby the current flowing through said primary winding is zero and the energy stored in said transformer is released via a current flowing through said secondary winding, wherein said fourth time interval ends when said current flowing through said secondary winding reaches zero;

during a subsequent fifth time interval of the switching cycle, keeping open said first electronic switch, closing said second electronic switch, and keeping closed said third electronic switch, whereby said clamp capacitor is electrically coupled in parallel with said primary winding, whereby said clamp capacitor and said leakage inductance form a resonant circuit having a given resonance period, and wherein said fifth time interval ends after one or more half-periods of said resonance period;

during a subsequent sixth time interval of the switching cycle, keeping open said first electronic switch, keeping closed said second electronic switch, and opening said third electronic switch, whereby the current flowing through said primary winding decreases, and wherein said sixth time interval ends when said current flowing through said primary winding is negative; and during a subsequent seventh time interval of the switching cycle, keeping open said first and third electronic switches and opening said second electronic switch, whereby the negative current flowing through said primary winding discharges said capacitance associated with said phase node.

2. The method according to claim 1, wherein said second electronic switch comprises a diode, and wherein closing said second electronic switch during said third time interval includes closing said diode.

3. The method according to claim 1, wherein said third electronic switch comprises a diode, and wherein closing said third electronic switch during at least one of said third time interval, said fourth time interval, and said fifth time interval includes closing said diode.

4. The method according to claim 1, comprising:
determining a reference value for said current flowing through said primary winding during said sixth time interval, said reference value being indicative of the energy to discharge said capacitance; and
ending said sixth time interval when said current flowing through said primary winding exceeds said given reference value.

5. The method according to claim 1, comprising:
determining a duration for said sixth time interval as a function of a duty cycles of said flyback converter, said duty cycle corresponding to a ratio between a duration of said first time interval and a duration of the switching cycle; and
ending said sixth time interval after said duration for said sixth time interval.

6. The method according to claim 1, comprising:
obtaining a maximum value for said output voltage and a minimum value for said input voltage;
determining a minimum clamp time as a function of said maximum value for said output voltage and said minimum value for said input voltage; and
selecting a capacitance value of said clamp capacitor, such that a half-period of said resonance period of said clamp capacitor and said leakage inductance is shorter than said minimum clamp time.

7. A control circuit for a flyback converter that includes first and second input terminals for receiving an input voltage, first and second output terminals for providing an output voltage, a transformer having primary and secondary windings and a leakage inductance, a first electronic switch coupled with the primary winding between the first and second input terminals, a phase node between the first electronic switch and the primary winding, a capacitance associated with the phase node, an active clamp connected to the primary winding and including a connection of a clamp capacitor and a second electronic switch, a third electronic switch electrically coupled with the secondary winding between the first and second (202b) output terminals, said control circuit being configured to:

during a first time interval of a switching cycle, close the first electronic switch and open the second and third electronic switches, wherein the closed first electronic switch during the first time interval electrically couples the primary winding to the input voltage and causes a current flowing through the primary winding to increase, thereby storing energy in the transformer;

during a subsequent second time interval of the switching cycle, open the first switch, and keep open the second and third electronic switches, whereby the current flowing through the primary winding charges the capacitance associated with the phase node;

during a subsequent third time interval of the switching cycle, keep open the first electronic switch and close both of the second and third electronic switches, which electrically couples the clamp capacitor with the primary winding and the current flowing through the primary winding charges also the clamp capacitor, wherein the third time interval ends when the current flowing through the primary winding reaches zero;

during a subsequent fourth time interval of the switching cycle, keep open the first electronic switch, keep closed said third electronic switch, and open the second electronic switch, whereby the current flowing through said primary winding is zero and the energy stored in the transformer is released via a current flowing through the secondary winding, wherein the fourth time interval ends when the current flowing through the secondary winding reaches zero;

during a subsequent fifth time interval of the switching cycle, keep open the first electronic switch, close the second electronic switch, and keep closed the third electronic switch, whereby the clamp capacitor is electrically coupled in parallel with the primary winding, whereby the clamp capacitor and the leakage inductance form a resonant circuit having a given resonance period, and wherein the fifth time interval ends after one or more half-periods of the resonance period;

during a subsequent sixth time interval of the switching cycle, keep open the first electronic switch, keep closed the second electronic switch, and open the third electronic switch, whereby the current flowing through the primary winding decreases, and wherein the sixth time interval ends when the current flowing through the primary winding is negative; and during a subsequent seventh time interval of the switching cycle, keep open the first and third electronic switches and open the second electronic switch, whereby the negative current flowing through the primary winding discharges the capacitance associated with the phase node.

8. The control circuit according to claim 7, wherein the second electronic switch comprises a diode, and wherein the control circuit is configured to close the second electronic switch during the third time interval by closing the diode.

9. The control circuit according to claim 7, wherein the third electronic switch comprises a diode, and wherein the control circuit is configured to close the third electronic switch during at least one of the third time interval, fourth time interval, and fifth time interval by closing said diode.

10. The control circuit according to claim 7, wherein the control circuit is configured to:
end the sixth time interval when the current flowing through the primary winding exceeds a given reference value indicative of the energy to discharge said capacitance.

11. The control circuit according to claim 7, wherein the control circuit is configured to:
end the sixth time interval after a duration that is a function of a duty cycle of the flyback converter, the duty cycle corresponding to a ratio between a duration of the first time interval and a duration of the switching cycle.

12. The control circuit according to claim 7, wherein the control circuit is configured to:
detect when the current flowing through the secondary winding reaches zero; and
end the fourth time interval in response to detecting that the current flowing through the secondary winding has reached zero.

13. A flyback converter, comprising:
first and second input terminals for receiving an input voltage;
first and second output terminals for providing an output voltage;
a transformer including a primary winding and a secondary winding, wherein a leakage inductance and a magnetizing inductance are associated with said transformer;
a first electronic switch connected with the primary winding between said first and second input terminals, wherein said first electronic switch and said primary winding are connected to each other by a phase node, wherein a capacitance is associated with said phase node;
an active clamp circuit connected with said primary winding, said active clamp circuit a clamp capacitor and a second electronic switch connected in series;
a third electronic switch connected with said secondary winding between said first and said second output terminals; and
a control circuit configured to:
during a first time interval of a switching cycle, close the first electronic switch and open the second and third electronic switches, wherein the closed first electronic switch during the first time interval electrically couples the primary winding to the input voltage and causes a current flowing through the primary winding to increase, thereby storing energy in the transformer;
during a subsequent second time interval of the switching cycle, open the first switch, and keep open the second and third electronic switches, whereby the current flowing through the primary winding charges the capacitance associated with the phase node;
during a subsequent third time interval of the switching cycle, keep open the first electronic switch and close both of the second and third electronic switches, which electrically couples the clamp capacitor with the primary winding and the current flowing through the primary winding charges also the clamp capacitor, wherein the third time interval ends when the current flowing through the primary winding reaches zero;
during a subsequent fourth time interval of the switching cycle, keep open the first electronic switch, keep closed said third electronic switch, and open the second electronic switch, whereby the current flowing through said primary winding is zero and the energy stored in the transformer is released via a current flowing through the secondary winding, wherein the fourth time interval ends when the current flowing through the secondary winding reaches zero;
during a subsequent fifth time interval of the switching cycle, keep open the first electronic switch, close the second electronic switch, and keep closed the third electronic switch, whereby the clamp capacitor is electrically coupled in parallel with the primary winding, whereby the clamp capacitor and the leakage inductance form a resonant circuit having a given resonance period, and wherein the fifth time interval ends after one or more half-periods of the resonance period;
during a subsequent sixth time interval of the switching cycle, keep open the first electronic switch, keep closed the second electronic switch, and open the third electronic switch, whereby the current flowing through the primary winding decreases, and wherein the sixth time interval ends when the current flowing through the primary winding is negative; and
during a subsequent seventh time interval of the switching cycle, keep open the first and third electronic switches and open the second electronic switch, whereby the negative current flowing through the primary winding discharges the capacitance associated with the phase node.

14. The flyback converter according to claim 13, wherein:
said first electronic switch is a n-channel FET;
said second electronic switch is a n-channel FET; and
said third electronic switch is a n-channel FET or a diode.

15. The flyback converter according to claim 13, wherein the second electronic switch comprises a diode, and wherein the control circuit is configured to close the second electronic switch during the third time interval by closing the diode.

16. The flyback converter according to claim 13, wherein the third electronic switch comprises a diode, and wherein the control circuit is configured to close the third electronic switch during at least one of the third time interval, fourth time interval, and fifth time interval by closing said diode.

17. The flyback converter according to claim 13, wherein the control circuit is configured to:
end the sixth time interval when the current flowing through the primary winding exceeds a given reference value indicative of the energy to discharge said capacitance.

18. The flyback converter according to claim 13, wherein the control circuit is configured to:
end the sixth time interval after a duration that is a function of a duty cycle of the flyback converter, the duty cycle corresponding to a ratio between a duration of the first time interval and a duration of the switching cycle.

19. The flyback converter according to claim 13, wherein the control circuit is configured to:

detecting when the current flowing through the secondary winding reaches zero; and end the fourth time interval in response to detecting that the current flowing through the secondary winding has reached zero.

* * * * *